(12) United States Patent
Alexander et al.

(10) Patent No.: US 8,033,115 B2
(45) Date of Patent: Oct. 11, 2011

(54) WATER INJECTION MANIFOLD PRESSURE RELIEF VENT

(75) Inventors: Michael J. Alexander, Simpsonville, SC (US); Kelvin R. Estrada, Gaffney, SC (US); Rohan Sharad Pimplikar, Greenville, SC (US); Robert J. Iasillo, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1273 days.

(21) Appl. No.: 11/306,639

(22) Filed: Jan. 5, 2006

(65) Prior Publication Data
US 2007/0151253 A1 Jul. 5, 2007

(51) Int. Cl.
*F02C 3/30* (2006.01)
(52) U.S. Cl. .......................... 60/775; 60/39.53
(58) Field of Classification Search .................. 60/775, 60/39.54, 39.55, 39.53, 39.3; 431/158
See application file for complete search history.

(56) References Cited

U.S. PATENT DOCUMENTS

| | | | | |
|---|---|---|---|---|
| 2,974,482 A * | 3/1961 | Kelley | | 60/39.3 |
| 3,100,964 A * | 8/1963 | Bevers et al. | | 415/26 |
| 3,693,347 A * | 9/1972 | Kydd et al. | | 60/775 |
| 4,672,817 A * | 6/1987 | Croce | | 62/183 |
| 5,175,994 A | 1/1993 | Fox et al. | | |
| 5,540,045 A * | 7/1996 | Corbett et al. | | 60/39.3 |
| 6,209,310 B1 | 4/2001 | Kuenzi et al. | | |
| 6,467,252 B1 | 10/2002 | Payling et al. | | |
| 6,484,508 B2 * | 11/2002 | Rocklin et al. | | 60/775 |
| 6,536,206 B2 | 3/2003 | Hook, Jr. et al. | | 60/39.53 |
| 6,938,425 B2 | 9/2005 | Simpson et al. | | 60/775 |

FOREIGN PATENT DOCUMENTS

| | | |
|---|---|---|
| JP | 05-125956 A | 5/1993 |
| JP | 11-218034 A | 8/1999 |
| JP | 2001-059427 A | 3/2001 |
| JP | 2002-522692 A | 7/2002 |
| JP | 2004-169593 A | 6/2004 |

* cited by examiner

*Primary Examiner* — Ehud Gartenberg
*Assistant Examiner* — Vikansha Dwivedi
(74) *Attorney, Agent, or Firm* — Sutherland Asbill & Brennan LLP

(57) ABSTRACT

A water injection system positioned about a combustor of a gas turbine engine. The water injection system may include a water manifold and a pressure relief system in communication with the water manifold. The pressure relief system may include a relief vent positioned on a pressure relief line.

13 Claims, 1 Drawing Sheet

WATER INJECTION MANIFOLD PRESSURE RELIEF VENT

TECHNICAL FIELD

The present application relates generally to gas turbine engines and more particular relates to a water pressure relief system for a water manifold used with a combustor of a gas turbine engine.

BACKGROUND OF THE INVENTION

Gas turbine engines generally include a compressor for compressing an incoming air stream. The air stream is mixed with fuel and ignited in a combustor for generating hot combustion gases. The combustion gases in turn flow to a turbine. The turbine extracts energy from the combustion gases for driving a turbine shaft. The turbine shaft powers the compressor and generally an external load such as an electrical generator.

Exhaust emissions from the hot combustion gases generally are a concern and may be subjected to mandated limits. Certain types of gas turbine engines are designed for low exhaust emissions operation, and, in particular, for low NOx (nitrogen oxides) operation. Low NOx turbine engines generally include a combustor in the form of a number of burner cans circumferentially adjoining each other around the circumference of the engine.

NOx emissions generally are related to the combustion temperature within the combustor. To control the temperature and the NOx emissions output, water can be added to the combustion process via a manifold positioned about the combustor. The amount of water generally is controlled as a function of fuel flow, relative humidity, and ambient temperature.

A load rejection is an instantaneous disconnection of the turbine generator from an electrical grid. The supply of fuel to the turbine therefore must be cutback quickly to prevent an over speed condition. Cutting back the fuel supply also must be done in a controlled manner so as to maintain flame stability. As the amount of water injected for NOx abatement is a function of fuel flow, the water flow to the combustor also must be stopped during a load rejection. Water injection manifold pressure reduction, however, may not always be fast enough to reduce the possibility of a flameout, i.e., the water already in the manifold may continue to flow into the combustor.

Thus is a desire, therefore, for an improved water manifold pressure relief system design that can react quickly to a load rejection. The increased reaction time should limit the possibility of flameout and the associated restart expenses.

SUMMARY OF THE INVENTION

The present application thus describes a water injection system positioned about a combustor of a gas turbine engine. The water injection system may include a water manifold and a pressure relief system in communication with the water manifold. The pressure relief system may include a relief vent positioned on a pressure relief line.

The pressure relief system may include a pressure transducer and an orifice plate positioned on the pressure relief line. The relief valve may include a solenoid valve. The pressure relief system may include a drain. The pressure relief line may include a position about a top of the water manifold. The pressure relief line may include a position adjacent to the manifold so as to reduce the volume of trapped air therein.

The water injection system further may include an incoming water source in communication with the water manifold. The incoming water source may include a water skid and a stop valve assembly. The water injection system further may include a backflow prevention valve positioned between the water manifold and the combustor.

The present application further describes a method for relieving the water pressure within a water manifold positioned about a combustor of a gas turbine during a load rejection. The method may include closing a stop valve assembly on an incoming water source in communication with the water manifold, opening a relief valve on a pressure relief line in communication with the water manifold, and draining the water within the water manifold via the pressure relief line. The relief valve may be open before the stop valve assembly is completely closed. The step of opening the relief valve prevents water from being injected into the combustor. The step of opening the relief valve further purges the pressure relief line of trapped air.

The present application further describes a water injection system positioned about a combustor of a gas turbine engine. The water injection system may include a water manifold and an incoming water source in communication with the water manifold. The incoming water source may include a stop valve. The water injection system also may include a pressure relief system in communication with the water manifold. The pressure relief system may include a relief vent and a pressure transducer positioned on a pressure relief line.

The pressure relief system may include an orifice plate. The relief valve may include a solenoid valve. The relief line may include a position about a top of the water manifold. The pressure relief line also may include a position adjacent to the manifold so as to reduce the volume of trapped air therein.

These and other objectives of the present application will become readily apparent to one of ordinary skill in the art upon review of the following detailed description of the invention when taken in conjunction with the drawings and the appended claims.

DETAILED DESCRIPTION

Figure 1:
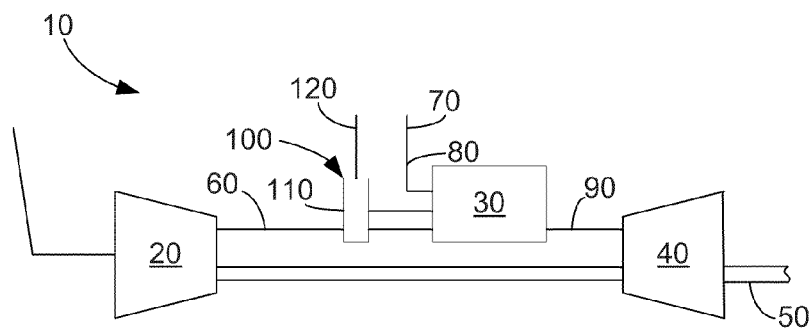
FIG. 1 is a schematic view of a gas turbine engine as is described herein.

Referring now to the drawings in which like numerals refer to like elements throughout the several views, FIG. 1 shows a turbine engine 10. The turbine engine 10 may include a compressor 20 disposed in serial flow communication with a low NOx combustor 30 and a turbine 40. As described above, the combustor 30 may take the form of a number of burner cans 35 positioned in a largely circular shape. Other types of combustors 30 may be used herein. The turbine 40 may be coupled to the compressor 20 via a drive shaft 50. The drive shaft 50 may extend from the turbine 40 for powering an electrical generator (not shown) or any other type of desired external load.

During operation as described above, the compressor 20 discharges a compressed airflow 60 into the combustor 30. A fuel injector 70 likewise may deliver a fuel flow 80 to the combustor 30 for mixing therein. The compressed airflow 60 and the fuel flow 80 are combusted in the combustor 30 to create a combustion gas stream 90. The energy from the combustion gas stream 90 is extracted by the turbine 40 for rotating the turbine shaft 50 so as to power the compressor 20 as well for driving a generator or other type of external load.

The turbine engine 10 also may include a water injection system 100 as is described herein. The water injection system 100 may be positioned in full or in part within a turbine compartment 105. The water injection system 100 may include a water manifold 110. The water manifold 110 may be fed from an incoming water source 120 via a water line 125. The water manifold 110 may be positioned about the combustor 30. Specifically, the water manifold 110 may be largely circular in shape so as to be positioned about the various burner cans 35. As is described above, the flow of water through the water manifold 110 is largely a function of the fuel flow 80 into the combustor 30.

Figure 2:
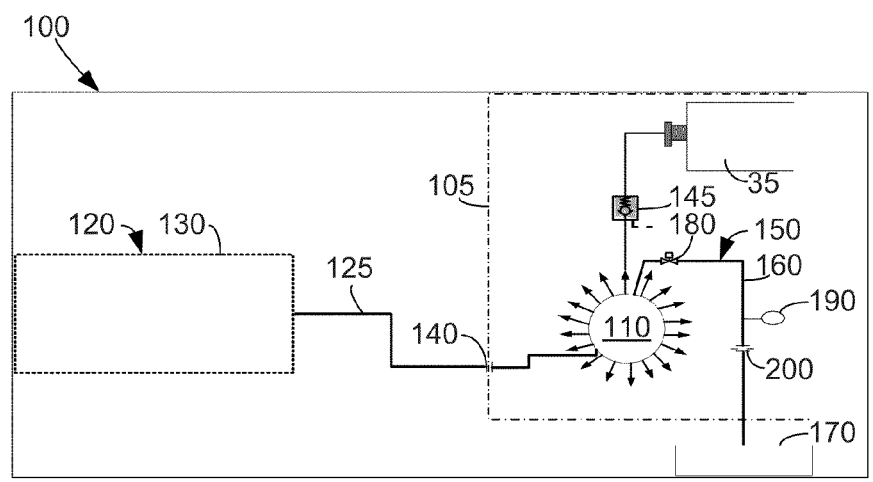
FIG. 2 is a schematic view of a water injection system for use with the gas turbine engine of FIG. 1.
Figure 3:
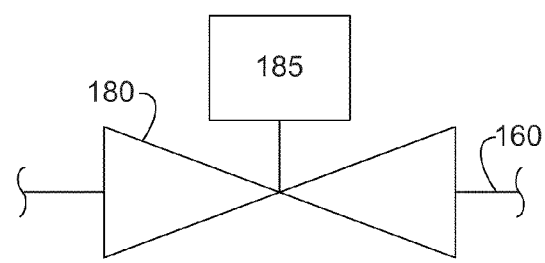
FIG. 3 is a schematic view of a relief valve with a solenoid thereon.

The water injection system 100 is shown in more detail in FIG. 2. The incoming water source 120 may take the form of a water injection skid 130. The water injection skid 130 may include a number of pumps, heat exchangers, and other devices as is known in the art. The water injection skid 130 may be connected to the water manifold 110 via a stop valve assembly 140. A backflow prevention valve 145 also may be positioned between the water manifold 110 and the combustor 30.

The water injection system 110 may include a pressure relief system 150. The pressure relief system 150 may include a pressure relief line 160. The pressure relief line 160 may extend from the water manifold 110 to a conventional drain 170 or any other type of water outlet. Positioned on the pressure relief line 160 may be a relief valve 180. A solenoid 185 or a similar type of device may operate the relief valve 180. The pressure relief line 160 also may include a pressure transducer 190. The pressure transducer 190 may be of conventional design. A pressure switch also may be used herein instead of the pressure transducer. Similar types of pressure devices also may be used herein. Also positioned on the pressure relief line 160 may be an orifice plate 200. The orifice plate 200 may be positioned about the drain 170. Similar structures may be used herein.

The pressure relief line 160 may be positioned about the top of the water manifold 110. The relief valve 180 may be located relatively close to the manifold 110 so as to reduce the volume of trapped air, if any in the pressure relief line 160. The relief valve 180, the pressure transducer 190, and the orifice plate 200 may be located outside of the turbine compartment 105.

During a load rejection, the stop valve assembly 140 may be commanded to close by the turbine operating system (not shown) while the relief valve 180 is commanded to open. The relief valve 180 is opened completely before the stop valve 140 is completely shut off. The use of the relief valve 180 thus allows pressure trapped within the manifold 110 to be released more or less faster than the drop in pressure in the combustor 30. With the release of the pressure, excess water, if any, within the manifold 110 will not be injected into the combustor 30 so as to avoid flame instability. Rather, the excess water will be diverted into the pressure relief line 160 and the drain 170. The relief valve 180 also is used to release any air trapped in the water injection system 100 before restart.

It should be apparently that the foregoing relates only to the preferred embodiments of the present application and that numerous changes and modifications may be made herein by one of ordinary skill in the art without departing from the general spirit and scope of the invention as defined by the following claims and the equivalents thereof.

What is claimed is:

1. A water injection system positioned about a combustor of a gas turbine engine, comprising:
    a water manifold;
    an incoming water source in communication with the water manifold via a water line and creating water pressure within the water manifold;
    the incoming water source comprising a stop valve assembly on the water line; and
    a pressure relief system in communication with and downstream of the water manifold;
    the pressure relief system comprising a relief vent positioned on a pressure relief line such that when the relief vent in the pressure relief system in communication with the water manifold opens as the stop valve assembly closes, water is drained from within the water manifold via the pressure relief line.

2. The water injection system of claim 1, wherein the pressure relief system comprises a pressure transducer positioned on the pressure relief line.

3. The water injection system of claim 1, wherein the pressure relief system comprises an orifice plate.

4. The water injection system of claim 1, wherein the relief vent comprises a solenoid valve.

5. The water injection system of claim 1, wherein the pressure relief system comprises a drain.

6. The water injection system of claim 1, wherein the pressure relief line comprises a position about a top of the water manifold.

7. The water injection system of claim 1, wherein the pressure relief line comprises a position adjacent to the water manifold so as to reduce the volume of trapped air therein.

8. The water injection system of claim 1, further comprising a backflow prevention valve positioned between the water manifold and the combustor.

9. A water injection system positioned about a combustor of a gas turbine engine, comprising:
    a water manifold;
    an incoming water source in communication with the water manifold via a water line and creating water pressure within the water manifold;
    the incoming water source comprising a stop valve on the water line;
    a pressure relief system in communication with and downstream of the water manifold;
    the pressure relief system comprising a relief vent and a pressure transducer positioned on a pressure relief line such that the relief vent in the pressure relief system in communication with the water manifold opens as the stop valve closes, water is drained from within the water manifold via the pressure relief line.

10. The water injection system of claim 9, wherein the pressure relief system comprises an orifice plate.

11. The water injection system of claim 9, wherein the relief vent comprises a solenoid valve.

12. The water injection system of claim 9, wherein the pressure relief line comprises a position about a top of the water manifold.

13. The water injection system of claim 9, wherein the pressure relief line comprises a position adjacent to the manifold so as to reduce the volume of trapped air therein.

* * * * *